(12) United States Patent
Kleban (10) Patent No.: US 8,051,427 B2
(45) Date of Patent: Nov. 1, 2011

(54) METHOD OF ESTABLISHING A LOGICAL STATE OF AN INSTANCE USING NON-DETERMINISTIC OPERATION RESULTS STORED IN A RESULT LOG

(76) Inventor: Jason Kleban, Washington, DC (US)

( * ) Notice: Subject to any disclaimer, the term of this patent is extended or adjusted under 35 U.S.C. 154(b) by 453 days.

(21) Appl. No.: 12/419,172

(22) Filed: Apr. 6, 2009

(65) Prior Publication Data

US 2010/0257544 A1 Oct. 7, 2010

(51) Int. Cl.
*G06F 3/00* (2006.01)
*G06F 11/00* (2006.01)
(52) U.S. Cl. .......................................... 719/310; 714/39
(58) Field of Classification Search .................. 719/310; 714/39
See application file for complete search history.

(56) References Cited

OTHER PUBLICATIONS

Peter Jason Willemsen, Behavior and Scenario Modeling for Real-Time vritual Environments, 2000.*
Ruy Ley-Wild, Matthew Fluet, Umut Acar, Compiling Self-Adjusting Programs with Continuations, Carnegie Mellon University, Toyota Technological Institute at Chicago, Sep. 24, 2008.
Peter Thiemann, WASH/CGI: Server-side Web Scripting with Sessions and Typed, Compositional Forms, Universitat Freiburg, Georges-Kohler-Allee 079, D-79085 Freiburg, Germany.
Peter Thiemann, An Embedded Domain-Specific Language for Type-Safe Server-Side Web-Scripting, Universitat Freiburg, Germany.
HUBFS: the Place for F#, Abstracted Processing. Copyright 2006. JJB, Research. cs.hubfs.net/forums/thread/6909,aspx> 9 pages.
Itasks, Generating Multi-User Workflow Systems for the WWWeb. www.cs.ru.nl/~rinus/iTaskIntro.html> 6 pages.
Chalmers, Advanced Functional Programming Assignment 2 www.cs.chalmers.se/Cs/Grundutb/Kurser/afp/lab2_printable.html.> 9 pages.

* cited by examiner

*Primary Examiner* — Lechi Truong
(74) *Attorney, Agent, or Firm* — Stetina Brunda Garred & Brucker (57) ABSTRACT

There is provided a method of establishing a logical state of an instance of a program. The method includes executing a first session. The program includes multiple sequences. Each sequence includes alternating deterministic operations and requests for non-deterministic operation results. A non-deterministic operation result is derived from a non-deterministic operation. The execution of the first session includes yielding a request for a non-deterministic operation result for one of the sequences. The request is generated by a first deterministic operation. The method includes terminating the first session at a first logical state prior to executing a second deterministic operation. The method includes executing upon the request. The method includes executing a second session using a log to establish a logical state of the instance. The method includes storing the non-deterministic operation result to the log. The method includes executing a continuation of the given sequence using the non-deterministic operation result.

12 Claims, 3 Drawing Sheets

METHOD OF ESTABLISHING A LOGICAL STATE OF AN INSTANCE USING NON-DETERMINISTIC OPERATION RESULTS STORED IN A RESULT LOG

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to computer software processing, and more particularly, to methods and systems of establishing a logical state of an instance using non-deterministic operation results stored in a result log.

2. Related Art

There are many software programs known as workflow programs which automate some or all of the otherwise manual steps required in real-world business processes. These kinds of programs can be understood as a mix of human (or external) inputs and rule-based transformations of those inputs.

For example, the business procedure for a company employee to officially request vacation time may instruct that the employee complete a provided form, obtain management-level written approval, and deliver the approved request form to the payroll department. Finally, the payroll department adjusts the records accordingly and notifies all interested parties. Some parts of this procedure such as the choice of the vacation days, the decision of the manager, and the adjustment of the payroll data may not be automatable, while other parts such as the routing of a completed form to a manager, the forwarding of the approved request to payroll, and the notification of the interested parties upon completion may be fully automatable. Such business processes easily take days or weeks to complete; for most of that time between initiation and completion, no computation is being performed and a naïve implementation sits idle while still consuming resources.

Standard operating system processes, which are normally used to model computer programs, are not well suited for these scenarios. Each operating system process maps to a single instance of a program. Each instance of an operating system process reserves fixed operating system resources while running but may use only a small fraction of those resources at its busiest. Even if two operating system processes are running exactly the same code, the code and the supporting libraries are loaded independently for each instance adding significant overhead per instance. Operating system processes are designed to run a set of instructions on a single physical machine from beginning to end and cannot be practically/efficiently suspended, stored, and resumed from storage.

Operating system processes cannot live beyond the uptime of a machine or computer that they are hosted upon. Processes which are unfinished when the machine or computer is rebooted unexpectedly or for maintenance must be started again from the beginning. Normally, if a program is to be resilient to these restarts and resume execution with a logically consistent state as though the restart had not happened, the developer must design custom routines to store and later load the data representing its state.

There are many technologies in the marketplace which in one way or another attempt to provide a runtime environment that is better suited to workflow-type programs. One goal of these technologies is to simplify the development of programs that model real-world processes, allowing the developer to focus on the real-world process rather than limited computer resources and reboots. Such technologies tend to be inspired by complex object-oriented methodologies with objects used to model computation.

Accordingly, there is a need in the art for improved methods and systems for computer processing in comparison to the prior art.

BRIEF SUMMARY

In accordance with an aspect of the present invention, there is provided a method of establishing a logical state of an instance of an executable computer program on a host computer. The method includes executing a first session of an instance of the computer program on the host computer. The computer program includes multiple sequences. Each sequence includes alternating deterministic operations and requests for non-deterministic operation results. A non-deterministic operation result is derived from a non-deterministic operation. Each deterministic operation outputs consistent results based upon same inputs. Each non-deterministic operation is not a deterministic operation. The execution of the first session includes yielding a request for a non-deterministic operation result for a given one of the sequences. The request is generated by a first deterministic operation. The method further includes terminating the first session at a first logical state prior to executing a second deterministic operation for such given sequence. The method further includes executing upon the request to generate a non-deterministic operation result. The method further includes executing a second session of the instance of the computer program on the host computer using a result log in a computer memory to establish a logical state of the instance identical to the first logical state. The method further includes storing the non-deterministic operation result to the result log. The method further includes executing a continuation of the given sequence using the non-deterministic operation result as an input.

According to various embodiments, a given one of the non-deterministic operations may be associated with a task to be completed by a user. A given one of the non-deterministic operations may be a subscription. Subsequent to yielding a request, the method may include presenting the request to a user interface. The step of executing upon the request to generate a non-deterministic operation result may include receiving a non-deterministic operation result from the user interface. The step of executing upon the request to generate a non-deterministic operation result may include waiting a fixed time period. The step of terminating the first session at the first logical state may include determining a type of the non-deterministic operation. The step of executing the continuation of the given sequence using the non-deterministic operation result may include executing a deterministic operation immediately following the request for the non-deterministic operation result for which of the non-deterministic operation result was generated. The computer program may include additional sequences that do not each include alternating deterministic operations and non-deterministic operations. A given deterministic operation of a given one of the sequences may be a grouping of deterministic operations.

According to another aspect of the invention there is provided a computer readable medium having computer-executable instructions for performing a method of establishing a logical state of an executable computer program on a host computer. The method includes executing a first session of an instance of the computer program on the host computer. The computer program includes multiple sequences. Each sequence includes alternating deterministic operations and non-deterministic operations. A non-deterministic operation result is derived from each non-deterministic operation. Each deterministic operation outputs consistent results based upon same inputs. Each non-deterministic operation is not a deterministic operation. The execution of the first session includes yielding a request for a non-deterministic operation result for a given one of the sequences, the request being generated by a deterministic operation. The method further includes terminating the first session at a first logical state prior to executing a second non-deterministic operation for such given sequence. The method further includes executing upon the request to generate a non-deterministic operation result. The method further includes executing a second session of the instance of the computer program on the host computer using a result log in a computer memory to establish a logical state of the instance identical to the first logical state. The method further includes storing the non-deterministic operation result to the result log. The method further includes executing a continuation of the given sequence using the non-deterministic operation result.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. Reference throughout the detailed description to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this detailed description are not necessarily all referring to the same embodiment. The following description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described to avoid obscuring aspects of the invention. It is further understood that the use of relational terms such as first and second, and the like are used solely to distinguish one from another entity without necessarily requiring or implying any actual such relationship or order between such entities.

Figure 1:
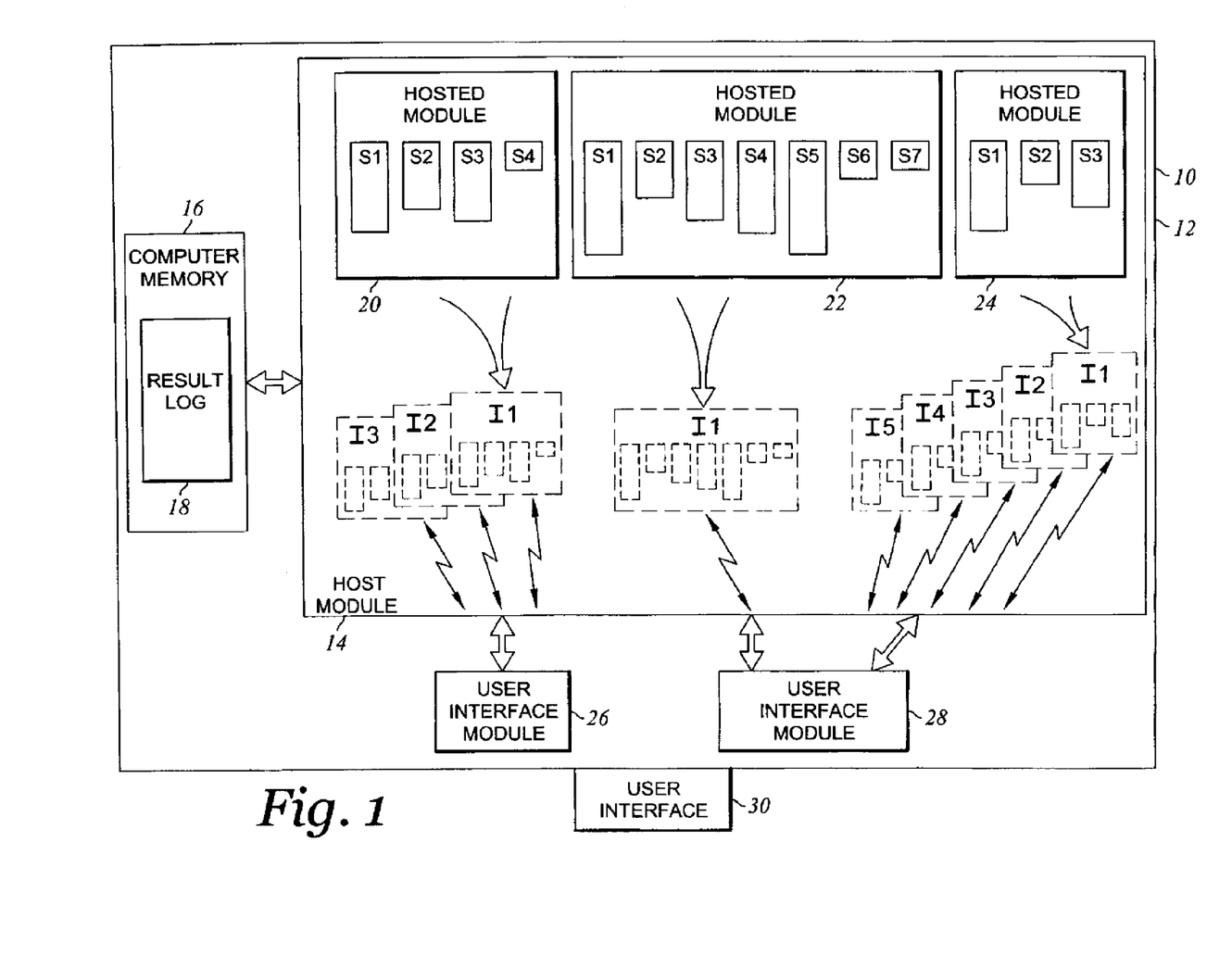
FIG. 1 is a symbolic block diagram illustrating an exemplary computing environment within which embodiments of the present invention may be implemented.

Referring now to FIG. 1 there is a symbolic block diagram illustrating an exemplary computing environment within which embodiments of the present invention may be implemented. There is provided a computer system 10 that includes host computer 12. The host computer 12 includes a host module 14 and hosted modules 20, 22, 24. The host module 14 is a computer program that facilitates the hosting of the hosted modules 20, 22, 24. In this respect the host module 14 is a computing environment. The hosted modules 20, 22, 24 are also computer programs. While hosted modules 20, 22, 24 are illustrated, it is contemplated that there may be one or more such hosted modules and that three such hosted modules are used herein as an example. The host module 14 allows each of the hosted modules 20, 22, 24 to have one or more instances launched as symbolically represented by instances I1, I2, I3 of hosted module 20, instance I1 of hosted module 22, and instances I1-5 of hosted module 24. While three instances I1, I2, I3 of hosted module 20 are illustrated, it is contemplated that there may be none or any number of instances hosted at any given time by the host module 14 and that three such instances are used herein as an example. The number of instances illustrated with respect to the hosted modules 22, 24 may likewise vary from what is illustrated. The host computer 12 further includes a computer memory 16. As will be discussed further below, a state log 18 is included in the host memory 16. The computer memory is used to service the needs of the host module 14 and other components of the host computer 12.

Each of the hosted modules 20, 22, 24 includes one or more sequences as symbolically represented by sequences S1-4 of hosted module 20, sequences S1-7 of hosted module 22, and sequences S1-3 of hosted module 24. While four sequences S1-4 of hosted module 20 are illustrated, it is contemplated that any number of sequences may be included. The number of sequences with respect to the hosted modules 22, 24 may likewise vary from what is illustrated.

Further in this example, the host computer 12 includes user interface modules 26, 28. A user interfaces module 26 is used to electronically communicate with the instances of the hosted module 20 via the host module 14. A user interfaces module 28 is used to electronically communicate with the instances of the hosted modules 22, 24 via the host module 14. In turn, the user interface modules 26, 28 are in electronic communication with a user interface 30. The user interface 30 is used to interface with users and may take the form of any number of devices that may receive and/or transmit input and output data. For example, the user interface 30 may directly communicate with users such as via a keyboard and monitor or may represent computer hardware that is used to communicate with other external devices or computers such as over a computer network.

As used herein the term "host computer", such as host computer 12, refers to any hardware, firmware or computing device capable of manipulating data according to a list of instructions, such as a computer program. Moreover, it is contemplated that the host computer 12 may include various components which may be an integrated single device or distributed in one or more physical locations. The host computer 12 may take the form of a personal computer, server, appliance or other device that may have portions distributed over a computer network. Although not limited to the specific, the host computer 12 may include a central processing unit (CPU) that executes programmed instructions in cooperation with various components of the same. System and user data, as well as the programmed instructions, are stored in a permanent storage device or hard disk drive, or a random access memory (RAM). As used herein the term "computer program" generically refers to a list of instructions that is capable of being interpreted by the host computer 12. Further, it is understood that the host module 14 and the hosted modules 20, 22, 24 may be a single integrated computer program or may be a combination of various computer programs that are configured to interface with each other. In this regard, the host module 14 and the hosted modules 20, 22, 24 may be located on a same component of the host computer 12 or distributed across any portions of the host computer 12.

Figure 2:
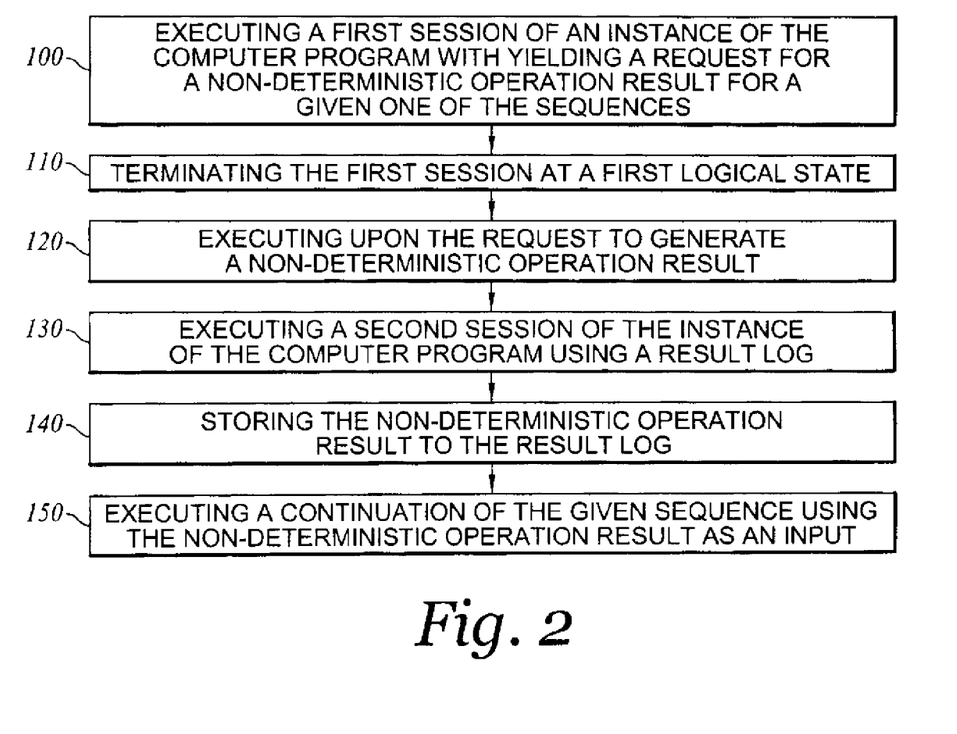
FIG. 2 is a flowchart of one embodiment of a method of establishing a logical state of an instance of an executable computer program.

In accordance with an aspect of the present invention, there is provided a method of establishing a logical state of an instance of an executable computer program on a host computer. Referring now to FIG. 2 there is provided a flowchart of one embodiment of a method of establishing a logical state of an instance of an executable computer program.

The method includes the step 100 of executing a first session of an instance of the computer program on the host computer 12. The computer program includes multiple sequences. Each sequence includes alternating deterministic operations and requests for non-deterministic operation results. A non-deterministic operation result is derived from a non-deterministic operation. Each deterministic operation outputs consistent results based upon same inputs. Each non-deterministic operation is not a deterministic operation. The execution of the first session includes yielding a request for a non-deterministic operation result for a given one of the sequences. The request is generated by a first deterministic operation. The method further includes the step 110 of terminating the first session at a first logical state prior to executing a second deterministic operation for such given sequence. The method further includes the step 120 of executing upon the request to generate a non-deterministic operation result. The method further includes the step 130 of executing a second session of the instance of the computer program on the host computer 12 using a result log in a computer memory (such as the result log 18 of the computer memory 16) to establish a logical state of the instance identical to the first logical state. The method further includes the step 140 of storing the non-deterministic operation result to the result log 18. The method further includes the step 150 of executing a continuation of the given sequence using the non-deterministic operation result as an input.

In further detail, as used herein the term "instance of a computer program" refers to an isolated progression of logical states as a whole of a computer program. Each instance of a computer program is isolated from other instances of the computer program. A computer program includes one or more (typically a multitude) sequences.

As used herein the term "sequence" refers a set of instructions representing a traversal over a control flow graph. At a minimum a sequence includes a deterministic operation. Other sequences may include deterministic operations and non-deterministic operations.

As mentioned above, in the context of the present invention, each sequence includes alternating deterministic operations and non-deterministic operations. However, it is understood that the term "each sequence" should not be interpreted to mean each and every sequence of the computer program. Thus, the computer program is contemplated to have a plurality of sequences with deterministic operations and non-deterministic operations and may additionally have other sequences that do not necessary have both deterministic operations and non-deterministic operations.

As used herein the term "deterministic operation" refers to an operation that does not have any interaction outside of the logical state of the related instance of the computer program. A deterministic operation transforms initial inputs into a request for a non-deterministic operation and/or may manipulate the logical state of the related instance of the computer program. No outside contributions are accessed from any external source to perform a deterministic operation, except for its explicitly defined inputs and its emitted results (i.e., requests for non-deterministic operation results). Moreover, each deterministic operation is independent of any other instances of a computer program. Importantly, each deterministic operation outputs consistent results based upon same inputs. In this regard, the performance of a deterministic operation is completely predictable and repeatable. As one of ordinary skill in the art will appreciate a particular deterministic operation may be composed of a grouping of multiple deterministic operations or a single deterministic operation.

As used herein the term "non-deterministic operation" refers to an operation that is not a deterministic operation. Non-deterministic operations are for 1) interaction outside of the logical state of the related instance of the computer program, and/or 2) requesting operations that are beyond the ability of the computer program itself to manipulate its own state. The computer instructions associated with implementation of the non-deterministic operations may be hosted by any portion of the computing system, including a host module and a hosted module.

Figure 3:
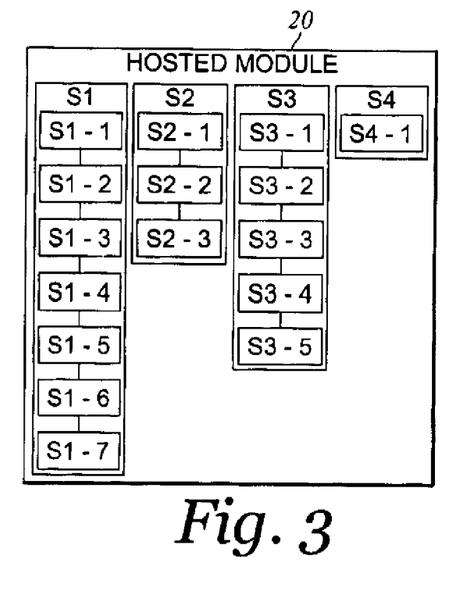
FIG. 3 is a symbolic block diagram of a host module of FIG. 1.

Referring additionally to FIG. 3 there is depicted a symbolic block diagram of the host module 20. In this example, the host module 20 includes four sequences S1, S2, S3, S4. Each sequence includes one or more operations. Sequence S1 includes operations S5-1 through S1-7. Sequence S2 includes operations S2-1 through S2-3. Sequence S3 includes operations S3-1 through S3-5. Sequence S4 only includes a single operation S4-1. Sequences S1-S4 each include one or more deterministic operations and non-deterministic operations. In this embodiment, each of the odd numbered operations are deterministic operations and each of the even numbered operations as non-deterministic operations. As such, sequence S1 includes deterministic operations S-1, S1-3, S1-5, S1-7 and non-deterministic operations S1-2, S1-4, S1-6.

Figure 4:
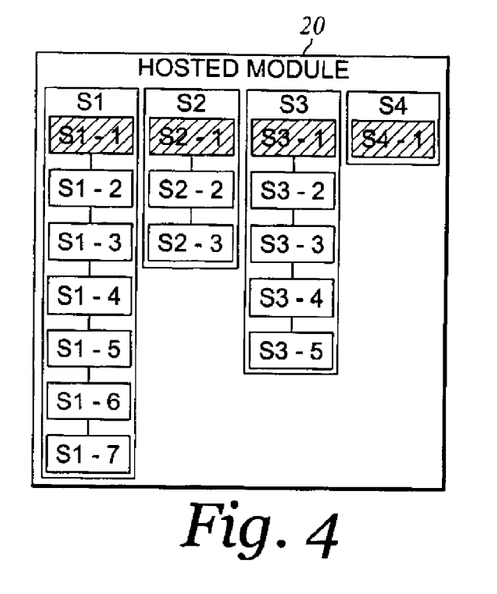
FIG. 4 is a symbolic block diagram of the host module of FIG. 3 with portions of sequences indicated as having been complete (indicated in hatching)

As mentioned above, the method includes the step 100 of executing a first session of an instance of the computer program on the host computer 12. In this regard, the computer program may be the hosted module 20 and the instance may be the instance I1 of the hosted module 20. Referring now to FIG. 4 there is depicted the symbolic block diagram of the hosted module 20. In each of the sequences S1, S2, S3, S4 the first operation is a deterministic operation. In this regard each sequence S1, S2, S3, S4 is able to proceed to complete the first operation S5-1, S2-1, S3-1, S4-1 (as indicated by the highlighting). As mentioned above, step 100 includes yielding a request for a non-deterministic operation result for a given one of the sequences. In this example, the deterministic operations S5-1, S2-1, S3-1 each yield a request for a non-deterministic operation. The term "yielding a request for a non-deterministic result" refers to a message to interrupt the sequence pending the availability of the non-deterministic operation result provided as input to the remainder of the sequence.

In the context of a business process, for example, there may be a business procedure for a company employee to officially request vacation time. This business procedure may instruct that the employee complete a provided form, obtain management-level written approval, and deliver the approved request form to the payroll department. Finally, the payroll department adjusts the records accordingly and notifies all interested parties. Some parts of this procedure such as the choice of the vacation days, the decision of the manager, and the adjustment of the payroll data may not be automatable, while other parts such as the routing of a completed form to a manager, the forwarding of the approved request to payroll, and the notification of the interested parties upon completion may be fully automatable. The non-automatable human decision steps in this example are related to non-deterministic operations (unpredictable) from the perspective of the business procedure or the system that is partially automating it: The employee is making the choice of which days to request and the choice of when to submit the request to the manager. The manager may have predictable biases, but the final decision is not practically predictable. The payroll system is not governed or tracked by this particular policy and so the results of the records adjustments are unknown. These events are considered non-deterministic from the perspective of the system performing it if the results of the operation cannot be predicted from the data input for the operation. In the example, two visually identical vacation request form submissions might be reviewed with different results because of some criteria that the manager uses to make the decision that is outside the scope of what the business procedure considers or the implementing system tracks.

The automatable steps in this example are deterministic, by definition within the business procedure. An employee submission of a vacation request always gets sent to the management team. A manager's approval always gets forwarded to payroll and a rejection always gets returned to the employee. The payroll analyst's reported actions always get sent to the interested parties. The interested parties are always calculated as the manager, the employee, and an email distribution list of human resources analysts. An operation is considered deterministic from the perspective of the system performing it if the results of the operation over data inputs are always the same. In the example, the calculations, or transformations performed to discover an employee's management team depend only on the identity of the employee and the dataset representing the current organizational hierarchy—given the same employee and org chart, the result of repeated executions will be consistent. If the system asks for the management team for a different employee, or if the organizational structure changes in an applicable way, the answer will be different from the previous example, but it will be consistent for that dataset.

An aspect of the present invention is that it abstracts some of the complexity of writing software to solve business problems such as the automation of the example vacation request procedure by exploiting the differences between the deterministic and non-deterministic operations involved. Any custom computer program, such as hosted modules 20, 22, 24 to be executed on the host module 14 may be written in a specific way such that the instructions are segmented into these two categories of instructions: those representing deterministic and non-deterministic operations.

Prior art systems view or represent system actions and human actions as a graph of objects. In contrast, the methods of the present invention, sequences represent computation which may pass message objects back to the host module 14 which executes and tracks non-deterministic operation results on the behalf of a sequence. Non-deterministic operations are associated with input/output activities as they observe or manipulate information external to the system or host module 14 or manipulation of a logical state of the instance which the sequences themselves cannot express. Examples of such input/output activities are: sending an email, reading the contents of a file, getting the current time, and generating a random number. These activities may be facilitated through the use of the user interface modules 26, 28 and user interface 30.

Returning to the example of FIG. 4, the operation S1-4 may be associated with a non-deterministic operation such as receiving a manager's approval. The specific timeframe in which the manager may respond is unknown. It may be 10 minutes or it may be over a week. In this regard, as mentioned above, the present method further includes the step 110 of terminating the first session at a first logical state prior to executing a second non-deterministic operation for such given sequence S1. Thus, the system resources may be freed up while the instance I1 of hosted module 20 is awaiting the requested non-deterministic operation result (as yielded in step 100). The instance I1 is able to release computing resources until the method continues with the step 120 of executing upon the request to generate a non-deterministic operation result. At this point the host module 14 may facilitate the step 130 of executing a second session of the instance I1 of the computer program (hosted module 20) on the host computer 12 using the result log 18 in a computer memory 16 to establish a logical state of the instance I1 identical to the first logical state.

Figure 5:
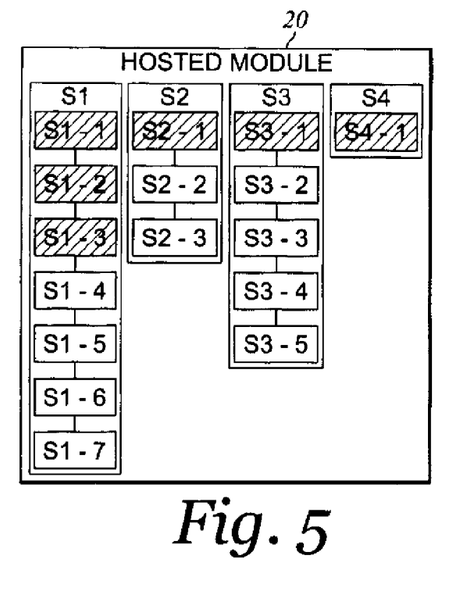
FIG. 5 is a symbolic block diagram of the host module of FIG. 4 with portions of sequences indicated as having been complete (indicated in hatching)

Referring now to the block diagram of FIG. 5, having now restored the last logical state, the present method may continue with the step 140 of storing the non-deterministic operation result to the result log 16. At this point, the sequence S1 has made incremental progress. The operation S1-3 as a deterministic operation may proceed to generate or yield a request for non-deterministic operation result associated with operation S1-4. Next the method may proceed with the step 150 of executing a continuation of the given sequence S1 using the non-deterministic operation result. In this regard, operations S1-2 and S1-3 are highlighted as indicating to have been completed. This then allows the method to repeat. At this point, the result log 18 has been updated with the non-deterministic operation result associated with the non-deterministic operation S1-2. The next action would be to repeat the step 110 of terminating the session (however, this is now the second session being terminated in this continuing example).

Figure 6:
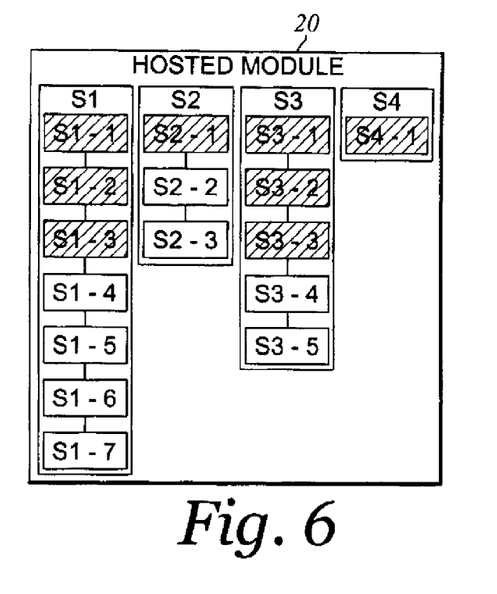
FIG. 6 is a symbolic block diagram of the host module of FIG. 5 with portions of sequences indicated as having been complete (indicated in hatching).

Referring now to FIG. 6, continuing with the example, the instance I1 of hosted module 20 may be informed that the requested non-deterministic operation result (as yielded by the deterministic operation S3-1) is now available. The step 120 of executing upon the request may thus be facilitated by the host module 14. The step 130 of executing a second (actually now a third in this repeating example) session of the instance I1 using the result log 18 to establish a logical state of the instance I1 identical to the "first" logical state (in this repeating example, this would be the logical state prior to terminating the session). The method continues with the step 140 of storing the non-deterministic operation result to the result log 18 (this is the non-deterministic operation result as requested from operation S3-1). At this point further incremental progress of the sequence is achieved. The method further includes the step 150 of executing a continuation of the given sequence S3 using the non-deterministic operation result as an input. As such the deterministic operation S3-3 may proceed to completion, as indicated with the highlight. The step of executing the continuation of the given sequence using the non-deterministic operation result may include executing the deterministic operation immediately following the non-deterministic operation for which of the non-deterministic operation result was generated.

It will be appreciated that deterministic operations take the input from the last operation (or the input data of the sequence) and either terminates or transforms that data into a new request for non-deterministic operation result. Within a given sequence, normal programming language supported control flow mechanisms are used to implement the transformations. Examples of non-deterministic operations further include assigning an external task, subscribing to (or registering interest in) an external type of event, jumping to another sequence, or forking to another sequence or process instance for parallel processing.

By definition, a process will have a default state, possibly empty. An instance of a hosted module (such as 20, 22 or 24) is initiated when a non-deterministic external event, the request for a new instance along with its custom data payload, prompts the host module 14 to allocate the new instance and submit the request's payload to the process's known entry point sequence. This startup operation uses the default state and the supplied payload to determine what action must be taken next which it then communicates back to the hosted module 14 by suspending its evaluation and responding to the host's call into its entry point with a request for a non-deterministic operation result. Deterministic operations transform data into various requests for non-deterministic operation results. The result of each of these requests is a single message of unbounded complexity that is passed back into the remainder of an unfinished sequence as additional input for the next transformation.

By following this model, the hosted module 14 can track the interaction between non-deterministic operations and deterministic operations. These constraints guarantee that the logical state of a partially executed instance of a hosted module (such as 20, 22, 24) can be rebuilt from the process's default state in the case that the instance has been prematurely unloaded from its host's memory by replaying the record of the results of the non-deterministic operations through the interleaved deterministic operations. Upon resuming or continuing an instance, the host module 14 feeds the inputs back to the sequences in the same order, responding to each yielded request for non-deterministic operation result stored in the result log 18. Once the data in the result log 18 has been depleted, the instance will be in the same logical state as it was before the interruption. Moreover, it is contemplated that an advantage of segregating the deterministic operations and requests for non-deterministic operation results is that previous logical states may be restored by replaying a truncated result log.

It is contemplated that the host computer 12 provides a flexible and powerful platform for solving workflow-style programming problems because the host computer 12 facilitates the independence of a process definition from the details of the hosting computer's traditional runtime environment; by clearly segmenting a process' deterministic operations from its nondeterministic operations and by recording and possibly replaying the results of the non-deterministic operations. In the terminology of functional programming, methodologies of aspects of the present invention can be expressed as a monad.

The present methods can be implemented with variations and optimizations depending on the language and code libraries used to implement it but should execute and track process instances through these basic mechanisms such as an executing sequence stack; a set of active tasks; a set of active subscriptions; a set of spawned subinstances; and a set of inactive sequences waiting on the completion of other sequences or subinstances.

According to various embodiments, a given one of the non-deterministic operations may be associated with a task to be completed by a user. A given one of the non-deterministic operations may be a subscription. As used herein the term subscription refers to a request to execute a specified sequence based on subscription criteria.

It is contemplated that an aspect of the present invention is the realization that the host module 14 may selectively terminate a given session of the runtime of an instance while that instance is awaiting execution of a non-deterministic operation result. This allows for the freeing up of valuable computing resources. Otherwise, the system would have to continue to reserve the allotted computing resources of the instance while awaiting results from the external environment of the computer system.

It is further contemplated that the step of terminating a given session need not be done immediately or after each and every request for a non-deterministic operation result. Such termination may be selectively effectuated in terms of whether to be done at all as well as to timing. In this regard, the method may further includes a step of determining a type of the non-deterministic operation for which a request for the associated non-deterministic operation result has been requested. For example, it may be generally or historically known or predictable that some types of requests are returned within certain timeframes. In this regard, it may be known for example that a specific request for a non-deterministic result is satisfied usually within a minute. In such a case, the step of terminating may be programmed to only take place if the request is not satisfied within a specified timeframe.

According to additional aspects of the present invention, there is provided a computer readable medium having computer-executable instructions for performing any of those method of establishing a logical state of an executable computer program on a host computer as disclosed herein.

What is claimed is:

1. A method of establishing a logical state of an instance of an executable computer program on a host computer, the method comprising the steps of:
   executing a first session of an instance of the computer program on the host computer, the computer program including multiple sequences, each sequence including alternating deterministic operations and requests for non-deterministic operation results, a given one of nondeterministic operations being associated with a task to be completed by an assigned user, a non-deterministic operation result being derived from a non-deterministic operation, each deterministic operation outputting consistent results based upon same inputs, each non-deterministic operation not being a deterministic operation, execution of the first session including:

yielding a request for a non-deterministic operation result for a given one of the sequences, the request being generated by a first deterministic operation;

terminating the first session at a first logical state prior to executing a second deterministic operation for such given sequence;

executing upon the request to generate a non-deterministic operation result;

executing a second session of the instance of the computer program on the host computer using a result log in a computer memory to establish a logical state of the instance identical to the first logical state;

storing the non-deterministic operation result to the result log; and executing a continuation of the given sequence using the non-deterministic operation result as an input.

2. The method of claim 1 wherein a given one of the non-deterministic operations is a subscription.

3. The method of claim 1 further includes, subsequent to yielding the request:

presenting the request to a user interface.

4. The method of claim 3 wherein the step of executing upon the request to generate a non-deterministic operation result includes:

receiving a non-deterministic operation result from the user interface.

5. The method of claim 1 wherein the step of executing upon the request to generate a non-deterministic operation result includes:

waiting a fixed time period.

6. The method of claim 1 wherein the step of terminating the first session at the first logical state includes:

determining a type of the non-deterministic operation.

7. The method of claim 1 wherein the step of executing the continuation of the given sequence using the non-deterministic operation result includes:

executing the deterministic operation immediately following the request for the non-deterministic operation result for which the non-deterministic operation result was generated.

8. The method of claim 1 wherein the computer program includes additional sequences that do not each include alternating deterministic operations and non-deterministic operations.

9. The method of claim 1 wherein a given deterministic operation of a given one of the sequences is a grouping of deterministic operations.

10. A computer memory having computer-executable instructions for performing a method of establishing a logical state of an executable computer program on a host computer, the method comprising the steps of:

executing a first session of an instance of the computer program on the host computer, the computer program including multiple sequences, each sequence including alternating deterministic operations and requests for non-deterministic operation results, a given one of non-deterministic operations being associated with a task to be completed by an assigned user, a non-deterministic operation result being derived from a non-deterministic operation, each deterministic operation outputting consistent results based upon same inputs, each non-deterministic operation not being a deterministic operation, execution of the first session including:

yielding a request for a non-deterministic operation result for a given one of the sequences, the request being generated by a first deterministic operation;

terminating the first session at a first logical state prior to executing a second deterministic operation for such given sequence;

executing upon the request to generate a non-deterministic operation result;

executing a second session of the instance of the computer program on the host computer using a result log in a computer memory to establish a logical state of the instance identical to the first logical state;

storing the non-deterministic operation result to the result log; and executing a continuation of the given sequence using the non-deterministic operation result as an input.

11. A computer memory having computer-executable instructions for performing a method of establishing a logical state of an executable computer program on a host computer, the method comprising the steps of:

executing a first session of an instance of the computer program on the host computer, the computer program including multiple sequences, each sequence including alternating deterministic operations and requests for non-deterministic operation results, a given one of non-deterministic operations being a subscription, a non-deterministic operation result being derived from a non-deterministic operation, each deterministic operation outputting consistent results based upon same inputs, each non-deterministic operation not being a deterministic operation, execution of the first session including:

yielding a request for a non-deterministic operation result for a given one of the sequences, the request being generated by a first deterministic operation;

terminating the first session at a first logical state prior to executing a second deterministic operation for such given sequence;

executing upon the request to generate a non-deterministic operation result;

executing a second session of the instance of the computer program on the host computer using a result log in a computer memory to establish a logical state of the instance identical to the first logical state;

storing the non-deterministic operation result to the result log; and executing a continuation of the given sequence using the non-deterministic operation result as an input.

12. A method of establishing a logical state of an instance of an executable computer program on a host computer, the method comprising the steps of:

executing a first session of an instance of the computer program on the host computer, the computer program including multiple sequences, each sequence including alternating deterministic operations and requests for non-deterministic operation results, a given one of non-deterministic operations being a subscription, a non-deterministic operation result being derived from a non-deterministic operation, each deterministic operation outputting consistent results based upon same inputs, each non-deterministic operation not being a deterministic operation, execution of the first session including:

yielding a request for a non-deterministic operation result for a given one of the sequences, the request being generated by a first deterministic operation;

terminating the first session at a first logical state prior to executing a second deterministic operation for such given sequence;

executing upon the request to generate a non-deterministic operation result;

executing a second session of the instance of the computer program on the host computer using a result log in a computer memory to establish a logical state of the instance identical to the first logical state;

storing the non-deterministic operation result to the result log; and executing a continuation of the given sequence using the non-deterministic operation result as an input.

\* \* \* \* \*